United States Patent [19]

Iinuma et al.

[11] Patent Number: 4,802,006

[45] Date of Patent: Jan. 31, 1989

[54] SIGNAL PROCESSING UNIT FOR PRODUCING A SELECTED ONE OF SIGNALS PREDICTIVE OF ORIGINAL SIGNALS

[75] Inventors: Kazumoto Iinuma; Toshio Koga; Akihiro Furukawa, all of Tokyo; Sakae Okubo, Kanagawa; Hideo Hashimoto, Kanagawa; Naoki Mukawa, Kanagawa, all of Japan

[73] Assignees: NEC Corporation; Nippon Telegraph and Telephone Corporation, both of Tokyo, Japan

[21] Appl. No.: 796,682

[22] Filed: Nov. 12, 1985

[30] Foreign Application Priority Data

Nov. 9, 1984 [JP] Japan .............................. 59-236227

[51] Int. Cl.[4] .............................................. H04N 7/12
[52] U.S. Cl. .................................... 358/135; 358/136; 364/518
[58] Field of Search ............... 358/105, 136, 135, 183, 358/182; 364/518

[56] References Cited

U.S. PATENT DOCUMENTS 4,546,386 10/1985 Matsumoto et al. ................ 358/105
4,591,909 5/1986 Kuroda et al. ...................... 358/136

Primary Examiner—Parshotam S. Lall
Assistant Examiner—David Goldman
Attorney, Agent, or Firm—Sughrue, Mion, Zinn, Macpeak & Seas

[57] ABSTRACT

In a predictive encoder for use particularly in a conference television system, a signal processing unit is used in producing a prediction signal and comprises three prediction circuits (22, 23, 31) and a selection circuit (24) coupled to the prediction circuits. The prediction circuits are for producing an inframe, an interframe, and a background prediction signals, respectively. Those signals are produced by processing an original signal at instants which precede a current instant and are different from one another. The selection circuit is for selecting one of the inframe, the interframe, and the background prediction signals. Therefore, it is possible to produce the prediction signal suitably predictive of the original signal. The signal processing circuit serves equally well in a predictive decoder.

4 Claims, 5 Drawing Sheets

FIG 3

| Sc | Sb | Sd |
|----|----|----|
| Sa | Sx |    |

| 0 | 0 | 0 |
|---|---|---|
| 0 | ✕ |   |

Sx = 0

| 1 | 0 | 0 |
|---|---|---|
| 0 | ✕ |   |

Sx = 0

| 0 | 0 | 1 |
|---|---|---|
| 0 | ✕ |   |

Sx = 0

| 1 | 0 | 1 |
|---|---|---|
| 0 | ✕ |   |

Sx = 1

| 1 | 0 | 1 |
|---|---|---|
| 1 | ✕ |   |

Sx = 1

| 1 | 1 | 0 |
|---|---|---|
| 1 | ✕ |   |

Sx = 1

| 1 | 1 | 1 |
|---|---|---|
| 0 | ✕ |   |

Sx = 1

| 1 | 1 | 1 |
|---|---|---|
| 1 | ✕ |   |

Sx = 1

SIGNAL PROCESSING UNIT FOR PRODUCING A SELECTED ONE OF SIGNALS PREDICTIVE OF ORIGINAL SIGNALS

BACKGROUND OF THE INVENTION

This invention relates to a signal processing unit for use in a digital transmission system, such as a closed-circuit television system.

In a television system, a succession of picture data is transmitted to convey television pictures from a transmitting end to a receiving end. The pictures are represented by a time sequence of a large number of picture elements.

Recent development of a conference television system is remarkable. In the conference television system, a predictive coding technique has been widely used on transmitting the picture data succession. This is because it is possible to compress the picture data succession which should be transmitted from the transmitting end to the receiving end. In the conference television system using the predictive coding technique, each of the transmitting and the receiving ends comprises a signal processing unit. The signal processing unit of the transmitting end is for producing a prediction signal predictive of the picture data succession.

A conventional signal processing unit comprises two prediction circuits and a selection circuit coupled to the prediction circuits in the manner which will later be described more in detail. One of the two prediction circuits is an interframe prediction circuit for predicting each frame of the picture data succession by a preceding frame to produce an interframe prediction signal. The other prediction circuit is herein called an additional prediction circuit. At a current instant of time, the additional prediction circuit predicts a part of the picture data succession to produce an additional prediction signal by an additional part which appears in the picture data succession at another instant previous to the current instant. The selection circuit is for selecting one of the interframe and the additional prediction signals as that part of the prediction signal which should be used at the current instant.

It is to be noted here as regards the conference television system that the picture element can be classified into three groups as follows. A first group of the picture elements is representative of a stationary area, namely, a background. A second group of the picture elements is representative of a movable object, such as a person who is participating in a conference. A third group of the picture elements is representative of, for example, that part of the background which become visible as a result of movement of the movable object.

In this connection, it has been found that the conventional signal processing unit is incapable of appropriately predicting the picture data signal. This is because the additional prediction signal is only predictive of either the first group of the picture elements or the second group.

SUMMARY OF THE INVENTION

It is therefore an object of the present invention to provide a signal processing unit which is capable of producing a prediction signal suitably predictive of an original signal.

This object and other objects of this invention will become clear as the description proceeds.

A signal processing unit to which this invention is applicable is for processing an original signal into a prediction signal predictive of the original signal at a current instant. The signal processing unit includes first predicting means for predicting a current part of the original signal at the current instant to produce a first prediction part by a first part which appears in the original signal at a first instant previous to the current instant. The signal processing unit further includes second predicting means for predicting the current part at the current instant to produce a second prediction part by a second part appearing in the original signal at a second instant which precedes the current instant and is different from the first instant. The improvement comprises third predicting means for predicting the current part at the current instant to produce a third prediction part by a third part appearing in the original signal at a third instant which precedes the current instant and is different from the first and the second instants, comparing means for comparing the first through said third prediction parts with the current part to produce a control signal, and selecting means responsive to the control signal for selecting one of the first through the third prediction parts as a current prediction part which is predictive of the current part in the original signal.

BRIEF DESCRIPTION OF THE DRAWINGS

FIG. 3 shows a judgment method which is used in the signal processing unit shown in FIG. 2;

DESCRIPTION OF THE PREFERRED EMBODIMENTS

Figure 1:
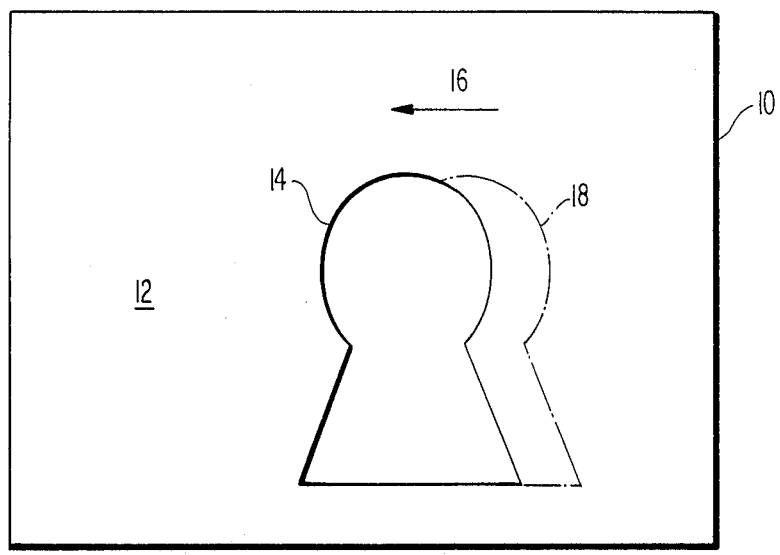
FIG. 1 is an explanatory view of a television picture having a movable portion.

Referring to FIG. 1, attention will be directed to a picture 10 which is being transmitted from a transmitting end of a conference television system. The picture 10 shows a stationary area 12 and a movable object 14. In the illustrated example, the movable object is a person who is participating in a conference. The stationary area 12 represents a background of the movable object 14. When the movable object 14 moves in a certain direction, such as a left direction indicated by an arrow 16, a new background 18 becomes visible as a part of the background 12 in the manner depicted right to the movable object 14.

Figure 2:
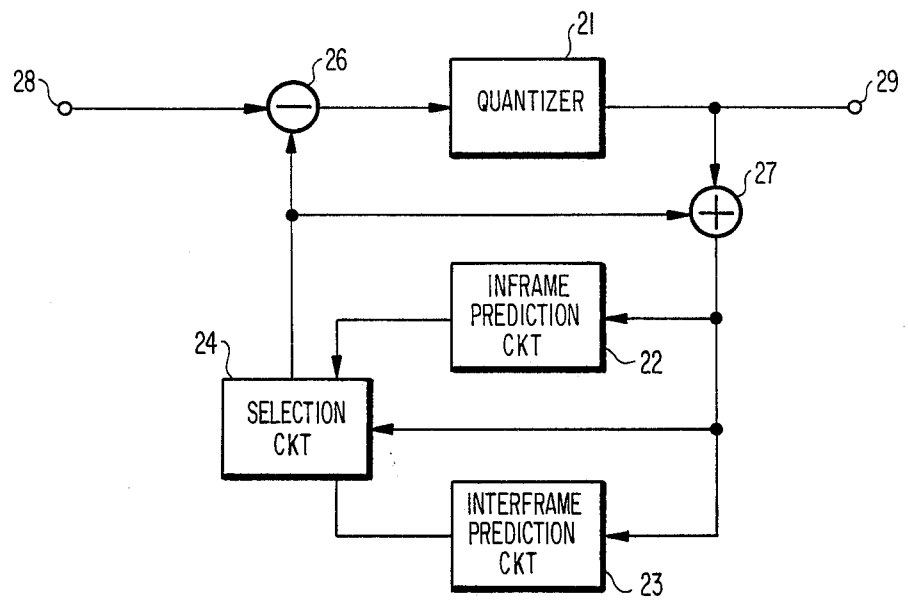
FIG. 2 is a block diagram of a conventional signal processing unit.

Referring to FIG. 2, a conventional signal processing unit will be described for a better understanding of the present invention. The signal processing unit comprises a quantizer 21, an inframe or intraframe prediction circuit 22, an interframe prediction circuit 23, a selection circuit 24, a subtractor 26, and an adder 27 in the manner which will presently become clear. A succession of picture data is supplied to the subtractor 26 as an original signal through an input terminal 28. A prediction signal is also supplied to the subtractor 26 from the selection circuit 24. The subtractor 26 subtracts the prediction signal from the original signal. A result of subtraction is produced as a differential signal from the subtractor 26. The differential signal is supplied to the quantizer 21. The quantizer 21 is for quantizing the differential signal into a quantized signal. The quantized signal is transmitted as a succession of coded data from an output terminal 29.

The quantized and the prediction signals are supplied to the adder 27 and are added together. A result of addition is produced as a local signal from the adder 27. It will be understood that the local signal is similar to the original signal and may therefore be referred to also as an original. The local signal is supplied to the inframe prediction, the interframe prediction, and the selection circuits 22, 23, and 24. The inframe and the interframe prediction circuits 22 and 23 are for delivering inframe and interframe prediction signals to the selection circuit 24. By way of example, the inframe and interframe prediction signals which appear at the current instant may be referred to as first and second prediction parts derived with reference to first and second parts appearing in the original signal at first and second instants which precede the current instant. The selection circuit 24 is responsive to the local, the inframe prediction, and the interframe prediction signals for selecting one of the inframe and the interframe prediction signals to produce the prediction signal.

Referring to FIG. 3, a selection rule is used in the selection circuit 24 in regard to a current picture element x and the four preceding adjacent picture elements to a to d and is for selecting either one of inframe and interframe prediction signals produced for each of the preceding adjacent picture elements a to d and the current picture element x, as mentioned above. As shown in FIG. 3, results of selection for the preceding adjacent picture elements a to d and the current picture element x are represented by Sa to Sd and Sx in one-to-one correspondence to the respective picture elements a to d and x.

Under the circumstances, it is assumed that the results Sa to Sd of selection for the preceding adjacent picture elements a to d are determined by a selector (not shown) of the selection circuit 24 and already stored in a memory part (not shown also) of the selection circuit 24. Let the selection rule be used to determine the result Sx for the current picture element x with reference to the results Sa and Sd read out of the memory part.

In this event, the result Sx of selection is given with reference to the results Sa to Sd by:

Sx=f(Sa, Sb, Sc, Sd), where f is representative of the selection rule. The logic "1" and "0" of the result Sx of selection are representative of selection of the interframe and the inframe prediction signals, respectively. The selection rule renders the result Sx into the logic "0" when Sa, Sb, Sc and Sd take "0000, " "0010," 0001, " and "0011," respectively, as exemplified along an upper line of FIG. 3. On the otherhand, the result Sx becomes the logic "1" when Sa, Sb, Sc, and Sd take "1011," "1110," "0111," and "1111," respectively, as exemplified along a lower line of FIG. 3.

Figure 4:
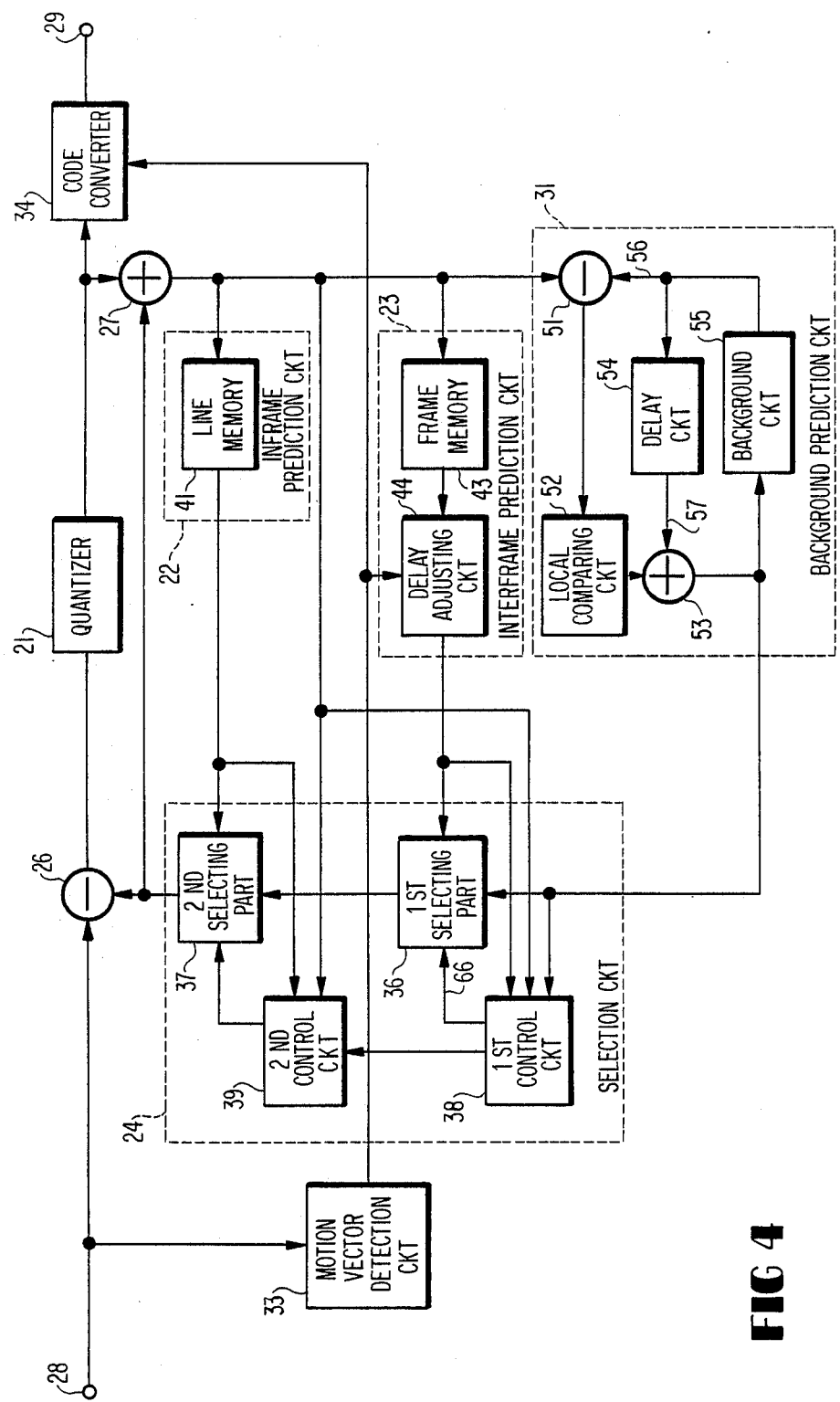
FIG. 4 is a block diagram of a predictive encoder comprising a signal processing unit according to a first embodiment of this invention.
Figure 5:
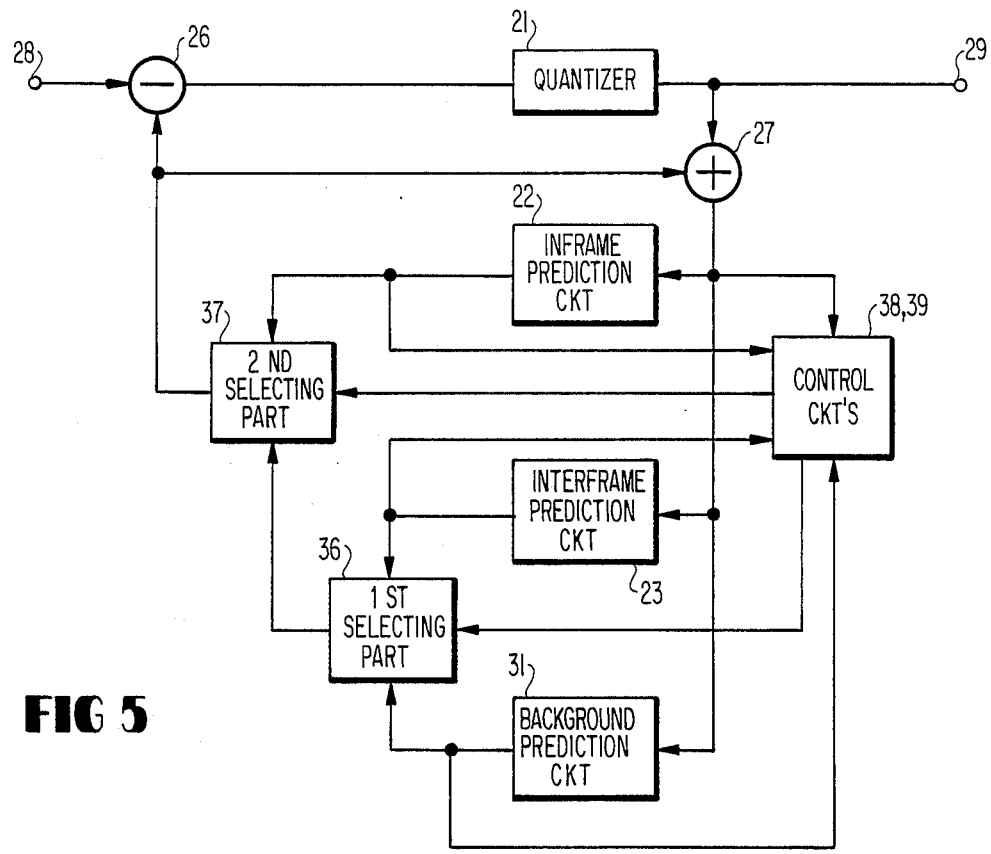
FIG. 5 is a block diagram of an equivalent circuit of the predictive encoder shown in FIG. 4.

Referring to FIGS. 4 and 5, a predictive encoder comprises a signal processing unit according to a first embodiment of this invention. The signal processing unit comprises similar parts designated by like reference numerals. In the manner which will be described in the following, the signal processing unit further comprises a background prediction circuit 31, a motion vector detection circuit 33, and a code converter 34. The selection circuit 24 comprises a first selecting part 36, a second selecting part 37, a first control circuit 38, and a second control circuit 39.

The inframe prediction circuit 22 includes a line memory 41. The line memory 41 is capable of temporarily memorizing the local signal for producing the inframe prediction signal. For the line memory 41, a first delay time is determined for delaying the local signal. The first delay time corresponds to a single line which comprises a plurality of picture elements. Alternatively, the first delay time may be a time interval between two adjacent picture elements. From the line memory 41, the local signal is delivered as the inframe prediction signal to the second control circuit 39 and the second selecting part 37.

The interframe prediction circuit 23 includes a frame memory 43 and a delay adjusting circuit 44. The frame memory 43 is capable of memorizing the local signal. In the frame memory 43, a second delay time is determined for delaying the local signal. The second delay time corresponds to a single frame which comprises a plurality of lines. The local signal is sent from the frame memory 43 to the delay adjusting circuit 44. In the delay adjusting circuit 44, the second delay time is adjusted in response to a motion vector signal sent from the motion vector detection circuit 33 in the manner which will presently be described. Namely, the interframe prediction signal is motion-compensated. Such motion compensating operation is disclosed in U.S. Pat. No. 4,307,420 issued to Yuichi Ninomiya et al and assigned to Nippon Hôsô Kyôkai, a public television broadcasting association in Japan. From the delay adjusting circuit 44, the local signal is delivered as the interframe prediction signal to the first control circuit 38 and the first selecting part 36.

The background prediction circuit 31 comprises a local subtractor 51, a local comparing circuit 52, a local adder 53, a delay circuit 54, and a background memory 55. The local subtractor 51 subtracts that preceding background signal from the local signal which is sent from the background memory 55 through a line 56. A result of the subtraction is produced as a local differential signal from the local subtractor 51. The local differential signal is supplied to the local comparing circuit 52. An absolute value of the local differential signal is compared with a predetermined threshold value in the local comparing circuit 52. When the absolute value of the local differential signal is lower than the predetermined threshold value, zero is sent to the local adder 53 as a predetermined value. Otherwise, the local differential signal is supplied as a modified differential signal to the local adder 53.

The local adder 53 adds the modified differential signal to the preceding background signal which is supplied from the delay circuit 55 through a line 57. A result of the addition is produced as a background prediction signal from the local adder 53 and is supplied to the first selecting part 36, the first control circuit 38, and the background memory 55. For convenience of description, the background prediction signal which appears at the current instant will be referred to as a third prediction part produced with reference to a third part appearing in the original signal at a third instant which precedes the current instant and which is different from the first and second instants.

The background memory 55 is capable of memorizing the single frame of the background prediction signal. In the background memory 55, a third delay time is determined for delaying the background predictive signal. The third delay time corresponds to the single frame. The background prediction signal is supplied as the preceding background signal from the background memory 55 to the local subtractor 51 and the delay circuit 54. The delay circuit 54 is for delaying the background prediction signal in response to the local comparing circuit 52.

Operation of the local comparing circuit 52 may be controlled by the motion vector signal derived from the motion vector detection circuit 33. More particularly, the local comparing circuit 52 may be designed so as to produce the predetermined value of zero in the absence of the motion vector signal irrespective of production or not of the local differential signal.

Figure 6:
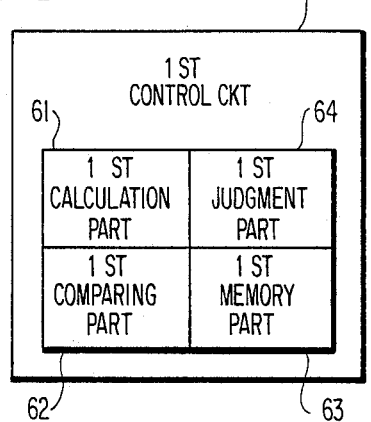
FIG. 6 schematically shows a first control circuit used in the signal processing unit shown in FIG. 4.

Referring to FIG. 6 in addition to FIG. 4, the first control circuit 38 comprises a first calculation part 61, a first comparing part 62, a first memory part 63, and a first judgment part 64. The first calculation part 61 is responsive to the local, the interframe prediction, and the background prediction signals and is for subtracting the local signal from each of the interframe and the background prediction signals to produce a first and a second prediction error signal. Absolute values of the first and the second prediction error signals are compared with each other in the first comparing part 62. A smaller one of the first and the second prediction error signals is selected by the first comparing part 62 and is memorized in the first memory part 63. A first judgment is carried out in the first judgment part 64 by using the first and the second prediction error signals which are memorized in the first memory part 63. The first judgment is for selecting a preferable one of the interframe and the background prediction signals to produce a selected prediction and a first selection or control signal. A rule for the first judgment may be similar to the selection rule described with reference to FIG. 3. The selected prediction signal is supplied to the second control circuit 39.

On the other hand, the first selection signal is sent to the first selecting part 36. The first selecting part 36 is responsive to the first selection signal and is for selecting one of the interframe and the background prediction signals to produce a local prediction signal which is equal to the selected prediction signal. The local prediction signal is supplied to the second selecting part 37. The local prediction signal may also be supplied to the second control circuit 39 in spite of the selected prediction signal which is supplied through a line 66.

Figure 7:
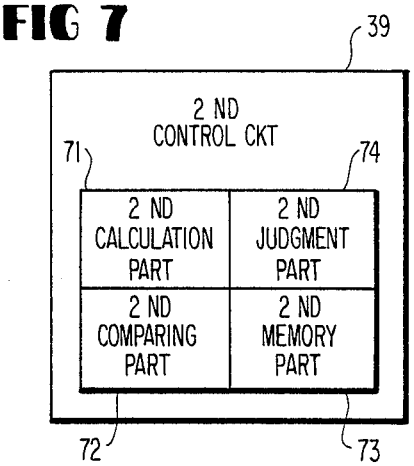
FIG. 7 likewise shows a second control circuit used in the signal processing unit shown in FIG. 4.

Referring to FIG. 7 in addition to FIG. 4, the second control circuit 39 comprises a second calculation part 71, a second comparing part 72, a second memory part 73, and a second judgment part 74. The second calculation part 71 is responsive to the local, the inframe prediction, and the local prediction signals and is for subtracting the local signal from each of the inframe and the local prediction signals to produce a third and a fourth prediction error signal. Absolute values of the third and the fourth prediction error signals are compared with each other in the second comparing part 72. A smaller one of the third and the fourth prediction error signals is selected by the second comparing part 72 and is memorized in the second memory part 73. A second judgment is carried out in the second judgment part 74 by using the third and the fourth prediction error signals which are memorized in the second memory part 73. The second judgment is for selecting a preferable one of the inframe and the local prediction signals to produce a second selection or control signal. A rule for the second judgment may also be similar to the selection rule described with reference to FIG. 3.

The second selection signal is sent to the second selecting part 37. The second selecting part 36 is responsive to the second selection signal and is for selecting one of the inframe and the local prediction signals to produce the prediction signal.

As will be clearly understood in the above description, a combination of the first and the second control circuits 38 and 39 serve as a comparing circuit for comparing the inframe, the interframe, and the background prediction signals with a current part of the local signal at each current instant.

It will now be understood that the prediction signal is supplied to the subtractor 26 and the adder 27 in the manner described with reference to FIG. 2. The quantized and the motion vector signals are supplied to the code converter 34. The code converter 34 is for processing the quantized and the motion vector signals to produce an output signal of, for example, a Huffman code. The output signal is transmitted as a succession of coded data from the output terminal 29.

Figure 8:
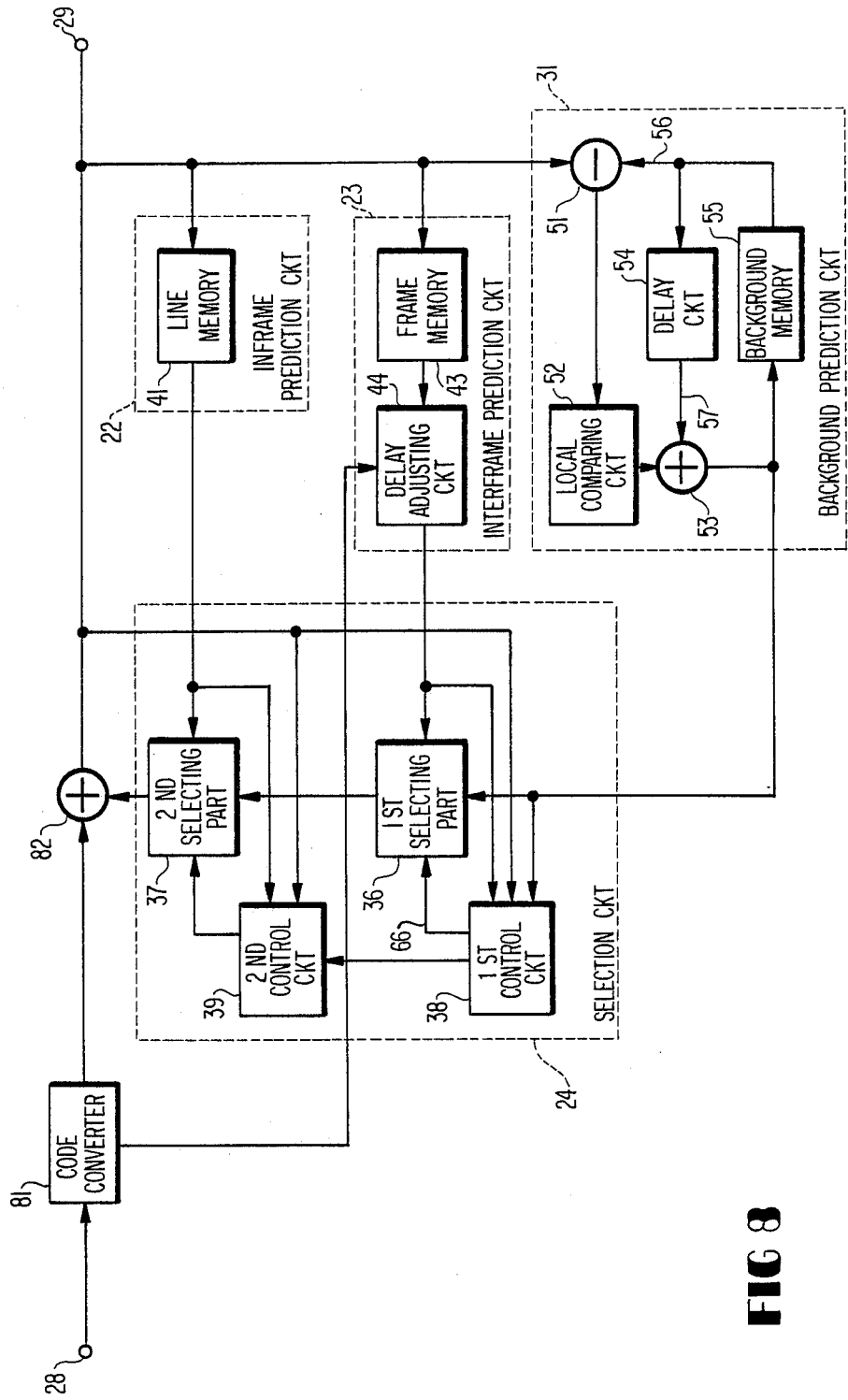
FIG. 8 is a block diagram of a predictive decoder comprising a signal processing unit according to a second embodiment of this invention.

Referring to FIG. 8, a predictive decoder comprises a signal processing unit according to a second embodiment of this invention. The signal processing unit comprises similar parts designated by like reference numerals. In the manner which will be described in the following, the signal processing unit further comprises a code converter 81 and an adder 82.

A succession of picture data is supplied to the code converter 81 through the input terminal 28 as an input signal. The picture data succession may be the coded data succession which is transmitted from the predictive encoder illustrated in FIG. 4. The code converter 81 is for processing the input signal to produce the motion vector signal and a converted local signal which is similar to the quantized signal described before. The motion vector signal is supplied to the delay adjusting circuit 44 for adjusting the second delay time of the frame memory 43.

The converted local signal is supplied to the adder 82. The prediction signal is also supplied to the adder 82 from the second selecting part 37. The adder 82 adds the converted local signal to the prediction signal. A result of addition is produced from the adder 82 as a decoded signal which is similar to the above-described original signal and may therefore be referred to also as an original. The decoded signal is supplied to the inframe prediction, the interframe prediction, the background prediction, the first control, and the second control circuits 22, 23, 31, 38, and 39. The decoded signal is also sent out as a succession of decoded data from the output terminal 29.

While this invention has thus for been described in conjunction with a few embodiment thereof, it will readily be possible for those skilled in the art to put this invention into practice in various other manners. It will be understood that various selection rule can be used for producing the prediction signal. For example, the selection rules used in the selection circuit 24 may be combined together so as to estimate efficiency about the inframe, the interframe, and the background predictions and to give grades from a high efficiency. Under the circumstances, one of the predictions may be determined one time by comparing the grades of the picture elements which are already predicted and adjacent to a current picture element.

What is claimed is:

1. A signal processing unit for use in processing an original signal into a prediction signal predictive of said original signal at a current instant, by the use of a local decoded signal produced in relation to a previous instant preceding said current instant said signal processing unit comprising:

inframe prediction means (22) for carrying out inframe prediction of said original signal by the use of said local decoded signal to produce an inframe prediction signal representative of a result of said inframe prediction;

interframe prediction means (23) for carrying out interframe prediction of said original signal by the use of said local decoded signal to produce an interframe prediction signal representative of a result of said interframe prediction;

background prediction means (31) for carrying out background prediction of said original signal by the use of said local decoded signal to produce a background prediction signal representative of a result of said background prediction;

controlling means (38, 39) coupled to said inframe, said interframe, and said background prediction means for controlling said inframe, said interframe, and said background prediction signals by the use of said local decoded signal to determine an optimum one of said inframe, said interframe, and said background predictions by selecting a minimum one of those absolute values of inframe, interframe, and background prediction errors which are calculated from a difference between said local decoded signal and each of said inframe, said interframe, and said background prediction signals, respectively, and to produce a control signal representative of said optimum one of the inframe, the interframe, and the background predictions: and selecting means (36, 37) coupled to said controlling means and said inframe, said interframe, and said background prediction means for selecting, as said prediction signal, one of said inframe, said interframe, and said background prediction signals that is determined by said control signal.

2. A signal processing unit claimed in claim 1, said signal processing unit being operable to code said original signal into a sequence of coded signals and comprising:

subtracting means (26) for subtracting said prediction signal from said original signal to produce a sequence of differential signals;

producing means (21) for producing said differential signal sequence as said coded signal sequence;

adder means (27) responsive to said coded signal sequence and said prediction signal for adding said coded signal sequence to said prediction signal to produce said local signal representative of a result of addition; and means for supplying said local signal to said inframe, said interframe, and said background prediction means, said controlling means, and said selecting means;

said inframe, said interframe, and said background prediction means carrying out said inframe, said interframe and said background predictions in response to said local signal.

3. A signal processing unit as claimed in claim 2, wherein said controlling means comprises:

first calculation means (61) (FIG. 6) coupled to said adder means, said interframe prediction means and said background prediction means for calculating said interframe prediction error and said background prediction error from said local, said interframe prediction, and said background prediction signals;

first comparing means (62, 63) for comparing the absolute value of said interframe prediction error with the absolute value of said background prediction error to produce, as a part of said control signal, a first control signal indicative of a smaller one of said absolute values of said interframe and said background prediction errors;

first producing means (64) for producing, as a selected prediction error, one of said interframe and said background prediction errors that is indicated by said first control signal;

second calculation means (71) coupled to said adder means and said inframe prediction means for calculating said inframe prediction error from said local and said inframe prediction signals; and second comparing means (72, 73) responsive to said selected prediction error and said inframe prediction error for comparing the absolute values of said selected and said inframe prediction errors with each other to produce, as another part of said control signal, a second control signal indicative of a smaller one of the absolute values of said inframe and said selected prediction errors:

first selection means (36) coupled to said interframe and said background prediction means and said first comparing means for selecting, as a selected prediction signal, one of said interframe and said background prediction signals that is indicated by said first control signal; and second selections means (37) coupled to said first producing means and said inframe prediction means for selecting as said prediction signal, one of said selected prediction signal and said inframe prediction signal that is indicated by said second control signal.

4. A signal processing unit as claimed in claim 2, said signal processing unit being operable to decode said coded signal sequence into said original signal and comprising:

sum means (82) for summing up said coded signal sequence and said prediction signal to produce said original signal;

delivering means for delivering said original signal to said inframe, said interframe, said background prediction means, said controlling means, and said selecting means; and said inframe, said interframe, and said background prediction means carrying out said inframe, said interframe, and said background predictions in response to said original signal.

* * * * *

UNITED STATES PATENT AND TRADEMARK OFFICE
CERTIFICATE OF CORRECTION

PATENT NO. : 4,802,006

DATED : January 31, 1989

INVENTOR(S) : KAZUMOTO IINUMA ET AL

It is certified that error appears in the above-identified patent and that said Letters Patent is hereby corrected as shown below:

Column 3, line 60, delete ""0001," and insert --"0001,"--.

Column 7, line 44, delete "predictions:" and insert --predictions;--.

Column 8, line 38, delete "errors:" and insert --errors;--.

Signed and Sealed this

Eighth Day of August, 1989

Attest:

DONALD J. QUIGG

Attesting Officer

Commissioner of Patents and Trademarks